Sept. 16, 1969 DU MONTE OTTO VOIGT ET AL 3,467,770

DUAL CHANNEL AUTOMATIC CONTROL CIRCUIT

Filed June 17, 1966

INVENTOR.
DuMonte O. Voigt
Richard Sorcola
BY
Pendleton, Neuman, Seibold & Williams
Attorneys 3,467,770
DUAL CHANNEL AUTOMATIC CONTROL CIRCUIT Du Monte Otto Voigt, Des Plaines, and Richard Avicola, Chicago, Ill., assignors to Hoffman Products Corporation, Chicago, Ill., a corporation of Delaware Filed June 17, 1966, Ser. No. 558,297
Int. Cl. H04n 5/38, 5/52
U.S. Cl. 178—5.4 10 Claims

ABSTRACT OF THE DISCLOSURE

An automatic control circuit is disclosed which in the described embodiment is used in a color television receiver to maintain constant chroma despite variations in brightness and contrast and includes a control circuit in the luminance channel responsive to variations in brightness and contrast producing a control signal effective to alter the gain of an amplifier in the chrominance channel.

Figure 1:
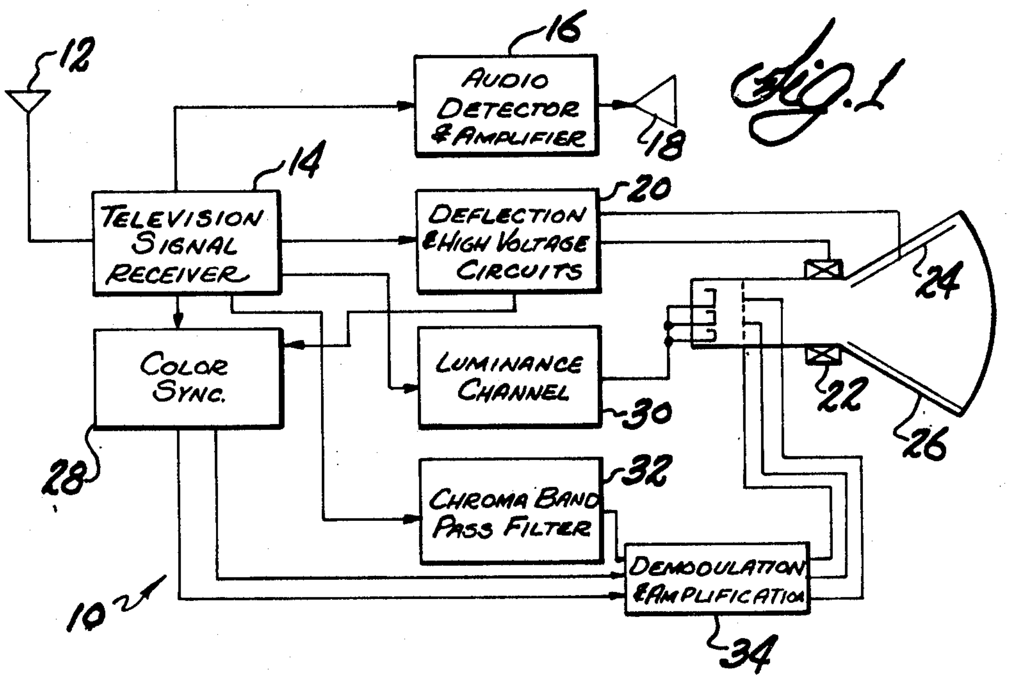

The present invention relates generally to an automatic control circuit and, more specifically, relates to an automatic chroma control circuit for a color television system or the like for maintaining color saturation of the reproduced picture substantially constant in the face of brightness and contrast adjustments.

Present day color television systems have a luminance channel and a chrominance channel. A variable brightness control and a variable contrast control are associated with the luminance channel to respectively allow for adjusting the brightness and contrast of the produced picture. It has been found that, when the brightness and/or the contrast are adjusted, the color saturation of the produced picture is affected thereby. Consequently, it has been desirable to provide circuitry for responding to changes in the setting of the brightness control and/or the contrast control to maintain the color saturation of the produced picture substantially constant.

A primary object of the present invention is to provide a new and improved automatic control circuit. More specifically it is an object to provide a new and improved automatic chroma control circuit for a color television system or the like. In this latter connection, it is an object to provide such a circuit for maintaining the color saturation of the produced picture substantially constant in the face of brightness and/or contrast adjustments.

A more specific object of the present invention is to provide a circuit, as set forth above, having a variable brightness control and a variable contrast control associated with the luminance channel wherein means are provided for controlling the chrominance signal level in accordance with the settings of the brightness control and/or the contrast control to maintain the color saturation of the produced picture substantially constant. A further object is to provide such a circuit wherein the chrominance signal control means controls the biasing of a chrominance channel amplifier in accordance with the settings of the brightness and/or contrast controls.

A general object of the present invention is to provide a new and improved automatic control circuit characterized in its simplicity, efficiency and economy which may readily be added to existing systems. Another general object is to provide a new and improved automatic chroma control circuit for a color television system or the like for maintaining the color saturation of the produced pictures substantially constant in the face of brightness and/or contrast adjustments characterized in its simplicity, efficiency and economy which may be readily added to existing systems.

Other objects and advantages of the invention will be come apparent upon reading the attached detailed description taken in conjunction with the drawing.

In one form of the present invention, an automatic chroma control circuit is provided for a color television system or the like. The circuit includes a variable brightness control and a variable contrast control. Additionally, means are provided for controlling the chrominance signal level in accordance with the settings of the brightness control and/or the contrast control to maintain color saturation substantially constant. It will be apparent that the present invention may be utilized for controlling the chrominance signal level in accordance with setting of the brightness control or the setting of the contrast control, as well as for controlling the chrominance signal level in accordance with the settings of both the brightness control and contrast control.

Figure 2:
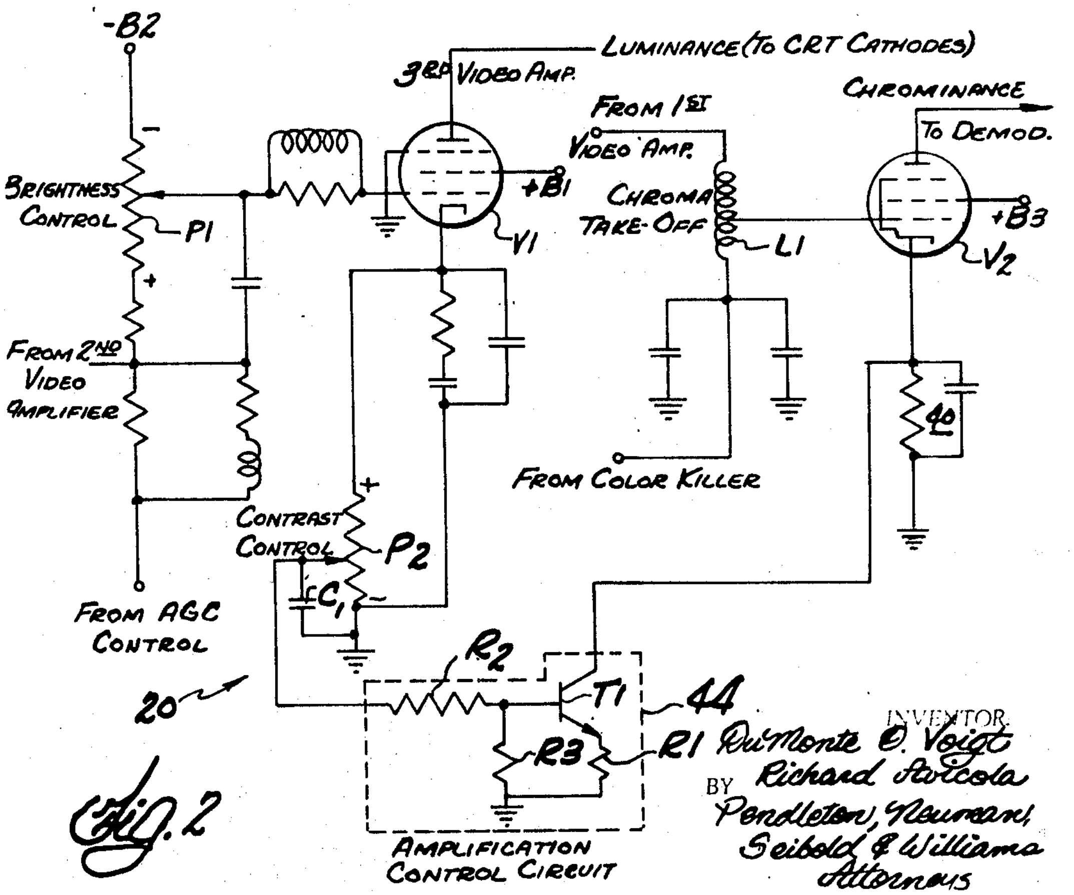

For the purpose of providing a detailed description of an automatic control circuit constructed in accordance with the teachings of the present invention, reference will now be made to the drawing wherein:

FIG. 1 is a block diagram illustrating a conventional color television system; and FIG. 2 is a schematic diagram of an automatic chroma control circuit employed in the color television system of FIG. 1 which is constructed in accordance with the teachings of the present invention.

While the invention has been shown and will be described in some detail with reference to a particular exemplary embodiment thereof, there is no intention that it be limited to such detail. Quite to the contrary, it is intended here to embrace all modifications, alternatives and equivalents falling within the spirit and scope of invention as defined by the appended claims. For the purpose of this description, the automatic control circuit construcuted in accordance with the teachings of the present invention will be described in conjunction with a color television system. However, it will be readily apparent that this is merely illustrative of one form of an automatic control circuit constructed in accordance with the teachings of the present invention.

Referring now to the drawing and, more specifically, to FIG. 1, a typical color television system is illustrated which may employ an automatic chroma control circuit constructed in accordance with the teachings of the present invention. Desired composite color television signals are picked up by an antenna 12 and are transmitted to a conventional television receiver 14. The receiver 14 functions to separate portions of a received composite signal into desired channels. Accordingly, the audio portion of the composite signal is transmitted from the receiver 14 to an audio detector and amplifier network 16 which drives a speaker 18. Additionally, information derived from the composite signal is transmitted to a horizontal and vertical sync and deflection network 20 which drives the deflection coils 22 and the ultor electrode 24 of the cathode ray tube 26. Further, information is derived from the composite signal to drive a color sync network 28 which, as will be discussed hereinafter, functions to maintain the synchronization of the chrominance channel. Finally, luminance and chrominance signals are derived from the composite signal which are respectively transmitted to a luminance channel network 30 and a chrominance channel band pass filter network 32. The output of the luminance channel 30 is utilized to control the potential at the cathodes of the cathode ray tube 26. The output of the chrominance channel band pass network 32 and the output of the color sync network 28 are transmitted to a demodulation and amplification network 34 which derives desired color signals therefrom and drives the control grids of the cathode ray tube 26. The color television system 10 as thus far described is a conventional system. Consequently, since the details of operation thereof are well known in the art, such details will not be set forth herein.

Referring now to FIG. 2, an automatic chroma control circuit 20 is shown which is constructed in accordance with the teachings of the present invention and which may be utilized in the color television system of FIG. 1. The chroma control circuit 20 includes a video amplifier V1 which is provided and functions as the output video amplifier in present conventional color television systems. The video amplifier V1 is driven from a preceding video amplifier (not shown) and functions to produce a luminance output signal which is transmitted to control circuitry (not shown) for the cathodes of the cathode ray tube 26 shown in FIG. 1. In the exemplary arrangement, the video amplifier V1 is disclosed as a pentode. The anode of the pentode V1 is connected to the control circuitry for the cathodes of the cathode ray tube 26, the suppressor grid is connected to ground and the screen grid is connected to a source of positive biasing potential B1. Additionally, the control grid of the pentode V1 is coupled to the output of the preceding video amplifier through a variable brightness control potentiometer P1 which allows for controlling the bias applied to the control grid. Further, the cathode of the pentode V1 is coupled to ground through a variable contrast control potentiometer P2 in which a by-pass capacitor C1 is connected to the wiper of potentiometer P2 to control degeneration. This allows for controlling the signal amplification of the pentode. Thus, the potentiometers allow for varying the overall luminance level or brightness as well as the signal amplitude. The chroma control circuit 20 also includes a band pass filter amplifier V2 which is positioned in the chroma channel of conventional color television systems for transmitting chroma signals to the demodulation and amplification network 34 (FIG. 1) which, in turn, drives the control grids of the cathode ray tube 26. The exemplary band pass filter amplifier V2 is also a pentode. The anode of the pentode V2 is coupled to the demodulation and amplification network 34, the suppressor grid is connected to the cathode which is coupled to ground through a resistor-capacitor biasing network 40, the screen grid is connected to a source of positive potential B3, and the control grid is connected to a chrominance takeoff inductor L1 which is associated with the output of a preceding video amplifier (not shown). As will be apparent, the biasing network 40 biases the cathode in accordance with the voltage drop developed thereacross which, in turn, is dependent upon the current flow therethrough. The portions of the circuit shown in FIG. 2, as thus far described, are conventional in present color television systems and, therefore, further details thereof will not be set forth herein.

In the system as thus far described, brightness and contrast adjustments are made by varying the settings of the brightness potentiometer P1 and the contrast potentiometer P2. It has been found that such brightness and contrast adjustments alter the color saturation of the produced picture. It is desirable to maintain the color saturation substantially constant in the face of brightness and contrast adjustments and, therefore, it has been desirable to compensate for color saturation changes resulting from brightness and contrast adjustments.

In accordance with the present invention, new and improved means are provided for automatically maintaining the color saturation of the produced display on tube 26 substantially constant in the face of changes in the settings of the brightness control potentiometer P1 and the contrast control potentiometer P2. More specifically, means are provided for controlling the chrominance signal level in accordance with the settings of the brightness control potentiometer P1 and the contrast control potentiometer P2 and, thus, in accordance with the luminance signal. In the exemplary arrangement, the chrominance signal level controlling means controls the cathode bias of the band pass filter amplifier V2 in accordance with the settings of the brightness control potentiometer P1 and the contrast control potentiometer 22.

Referring again to FIG. 2, it will be seen that the exemplary chroma control circuit 20 includes an amplification control circuit 44 which is disposed between the contrast control potentiometer P2 and the cathode of the band pass filter amplifier V2. The amplification control circuit includes a transistor T1 which controls the bias on the cathode of the band pass filter amplifier V2 in accordance with the amount of conduction thereof. The collector of the transistor T1 is connected directly to the cathode of the band pass filter amplifier V2, the emitter thereof is connected to ground through a resistor R1 and the base is connected to the adjustable arm of the contrast control potentiometer P2 through a resistor R2. Additionally, the base of the transistor is connected to ground through a resistor R3. As will become apparent, the amplification control circuit 44 functions as a current bypassing network for the cathode biasing network 40 of the band pass filter amplifier V2.

For the purpose of providing a better understanding of the operation of the amplification control circuit, the operation thereof will now be set forth. Initially, let it be assumed that the brightness control potentiometer P1 and the contrast control potentiometer P2 are at desired settings. Under these conditions, a prescribed amount of current flows in the cathode circuit of the video amplifier V1 which flows through the contrast control potentiometer P2 and develops a prescribed voltage thereacross. Accordingly, a prescribed voltage is developed across the tapped portion of the contrast control potentiometer P2, i.e., between the variable contact arm thereof and ground. The voltage developed across the tapped portion of the contrast control potentiometer P2 is applied to the base circuit of the transistor T1 causing the base to be maintained positive with respect to the emitter so that the transistor T1 is maintained in a conducting state. At this time, a prescribed amount of the current flowing in the cathode circuit of the band pass filter amplifier V2 flows through the collector-emitter circuit of the transistor T1 and by-passes the biasing network 40 in the cathode circuit so that a prescribed bias is maintained on the cathode of the band pass filter amplifier V2 with the initial settings of the potentiometers P1 and P2.

If the setting of the variable contact arm of the brightness control potentiometer P1 is varied to decrease the bias voltage applied to the control grid of the video amplifier V1 and thus to increase the luminance level, the amplifier V1 becomes more conductive causing more cathode current to flow so that the voltage developed across the contrast control potentiometer P2, and thus across the tapped portion thereof, is increased. Likewise, if the setting of the variable contact arm of the contrast control potentiometer P2 is varied to decrease the degeneration developed thereacross, a greater voltage is developed across the tapped portion of the potentiometer P2. When the voltage developed across the capacitor C1 and the tapped portion of the contrast control potentiometer P2 increases, the base current of the transistor T1 increases causing the transistor T1 to become more conductive. Under these conditions, a greater amount of the current flowing in cathode circuit of the band pass filter amplifier V2 is caused to by-pass the biasing network 40 so that the bias on the cathode is reduced and the amplification of the band pass filter amplifier V2 is increased correspondingly to increase the chrominance signal level. Thus, as the brightness is increased or the contrast is increased, the chrominance signal level is increased correspondingly. This compensates for changes in the picture saturation level resulting from the brightness or contrast changes.

Conversely, when the setting of the variable contact arm of the brightness control potentiometer P1 is varied to increase the bias voltage applied to the control grid of the video amplifier tube V1 and thus to reduce the luminance level, the conduction of the video amplifier V1 is reduced so that less cathode current flows. Consequently, the voltage developed across the contrast control potentiometer P2, and thus across the tapped portion thereof, is decreased. Likewise, if the setting of the variable contact arm of the contrast control potentiometer P2 is varied to increase the degeneration thereacross, the voltage developed across the tapped portion of the potentiometer P2 is decreased. When the voltage developed across the tapped portion of the contrast control potentiometer P2 is decreased, the base current of the transistor T1 decreases causing the conduction of the transistor T1 to decrease and less current is caused to by-pass the biasing network 40 in the cathode circuit of the band pass filter amplifier V2. Consequently, the bias on the cathode of the amplifier V2 is increased causing the amplification thereof to decrease and thus causing the chrominance signal level to be decreased correspondingly. Thus, as the brightness or the contrast is reduced, the chrominance signal level is reduced correspondingly. This decrease in the chroma signal level again compensates for changes in the saturation level of the produced display of picture tube 26 resulting from a reduction of the brightness or the contrast.

In addition to the benefits attained with this invention in automatically controlling chroma, that is, the dimension of the Munsell system which corresponds most closely to saturation, in response to manual variations in contrast or brightness, this invention provides additional automatic compensation. Because of the nature of signal transmission and spectral variations in transmission the luminance signal may vary in amplitude with station changes and environmental conditions. With the instant circuit there is a correction bias fed from the luminance channel to the chrominance channel which will tend to automatically compensate for transmission anomalies.

Furthermore, it has been observed that in circuits incorporating this invention a desirable effect is produced in the picture reproduction for scene changes. If the change is between a scene with a high light level and one of low light level the automatic chroma control of this invention tends to maintain a more pleasing saturation of the reproduction. The degree to which chroma control is effected is controlled by altering the effective gain of the control circuit either by initial selection of the transistor or by varying the circuit resistors or other circuit parameters.

In view of the foregoing, it will be seen that a new and improved circuit has been provided for maintaining the color saturation level of a color television system substantially constant in the face of brightness and/or contrast adjustments. More specifically, it will be seen that a new and improved circuit has been provided for controlling the chrominance signal level in accordance with the settings of brightness and contrast control potentiometers in the luminance channel.

What is claimed is:

1. An automatic chroma control circuit for a color television system or the like, which comprises a luminance channel to amplify a luminance signal including a variable brightness control and a variable contrast control, a chrominance channel to amplify a chrominance signal, control means in said luminance channel generating a control signal varying in accordance with variations in said brightness control or said contrast control, and responsive means energized with said control signal to maintain the chroma substantially constant over a substantial range of variations in brightness and contrast.

2. The circuit as recited in claim 1 wherein the brightness control and the contrast control each includes an adjustable potentiometer, wherein the brightness and contrast potentiometers are associated with an amplifier in the luminance channel of the color television system, wherein the chrominance signal channel includes an amplifier, and wherein the responsive means biases the chrominance channel amplifier in accordance with the settings of the potentiometers.

3. The circuit as recited in claim 2 wherein the responsive means includes a transistor having its input associated with the control mean in the luminance channel and its output associated with the chrominance channel amplifier.

4. The circuit as recited in claim 2 wherein the luminance channel amplifier includes a pentode having the control grid associated with the brightness potentiometer and its cathode associated with the contrast potentiometer, wherein the chrominance channel amplifier includes a pentode having its cathode associated with the responsive means and wherein the responsive means is interposed between the wiper of the contrast potentiometer and the cathode of the chrominance channel amplifier.

5. An automatic chroma control circuit for a color television system or the like, which comprises a luminance channel amplifier device having its output coupled to subsequent luminance channel circuitry, means for coupling an input signal representative of luminance information to the control element of the luminance channel device including a brightness control, a contrast control forming a part of the cathode circuit for the luminance channel device, a chrominance channel amplifier device having its output coupled to subsequent chrominance channel circuitry, means for coupling an input signal representative of chrominance information to the control element of the chrominance channel device, and means interposed between the contrast control and the cathode of the chrominance channel device for controlling the bias on the chrominance channel device in accordance with the settings of the contrast control and the brightness control.

6. An automatic chroma control circuit for a color television system or the like, which comprises amplifier means for the luminance signal operating at a bias level, a variable control for the picture luminance coupled to said amplifier means and varying said bias level, and circuit means responsive to said bias level for controlling the chrominance signal level in accordance with the setting of the variable control.

7. The automatic chroma control circuit of claim 6 wherein the variable control controls the picture brightness.

8. The automatic chroma control circuit of claim 6 wherein the variable control controls the picture contrast.

9. An automatic control circuit for an electronic amplification system having two separate but interrelated channels, which comprises variable means associated with one channel for controlling the A.C. and D.C. levels of the signal therein, and circuit means responsive to said A.C. and D.C. levels and controlling the signal level in the other channel in accordance with the setting of the variable means to compensate for changes in the signal level in the other channel resulting from changes in the A.C. or D.C. signal levels of the one channel and the interrelationship of said channels.

10. An automatic control circuit for an electronic system having two separate but interrelated circuits for handling two separate but related signals, said circuit comprising signal translating means for translating the first of said signals, signal translating means for translating the second of said signals, and circuit means responsive to the A.C. and D.C. signal levels in one of said interrelated circuits for modifying the translating characteristics of the translating means associated with the other of said interrelated circuits in accordance with variations in said A.C. and D.C. signal levels.

References Cited

UNITED STATES PATENTS

| | | | |
|---|---|---|---|
| 2,841,643 | 7/1958 | Loughlin. | |
| 3,267,210 | 8/1966 | Townsend. | |
| 3,374,310 | 3/1968 | Beers | 178—5.4 |

RICHARD MURRAY, Primary Examiner